Sept. 12, 1950     C. R. BERGMAN     2,522,017
MINNOW TRAP
Filed June 27, 1947

Inventor
Carl R. Bergman
By Randolph & Beavers
Attorneys

Patented Sept. 12, 1950

2,522,017

UNITED STATES PATENT OFFICE 2,522,017

MINNOW TRAP

Carl R. Bergman, Minocqua, Wis.

Application June 27, 1947, Serial No. 757,395

1 Claim. (Cl. 43—57)

This invention relates to a combined minnow trap and bucket having aerating means, a primary object of the invention being to provide an efficient and practical device of this character which is usable as a trap for trapping minnows in a stream, and thereafter readily adjusted to act as a container or bucket for the live minnows trapped therein wherein means is provided for aerating the water whenever necessary to provide sufficient air for the live minnows.

Another important object of this invention is to provide a device of the character indicated above in which the combined trap and bucket is formed of transparent material so that the water and minnows within the device can be seen, and so that while the device is acting as a trap in a stream it will be substantially invisible in the water so as to more efficiently trap the minnows.

Another important object of this invention is to provide a substantially imperforate minnow trap having smooth, highly finished walls, preferably of plastic material, against which the minnows cannot bruise and otherwise injure themselves, as they do in the ordinary perforate wire traps.

A further important object of this invention is to provide a device of the character indicated above which is susceptible of being constructed substantially entirely of plastic material, preferably transparent for the purposes indicated, and to render the same more easily cleaned and not subject to rust and corrosion.

Other important objects and advantageous features of this invention will be apparent from the following description and the drawing thereunto appended, wherein, merely for purposes of illustration, a presently preferred embodiment is set forth in detail.

Figure 1:
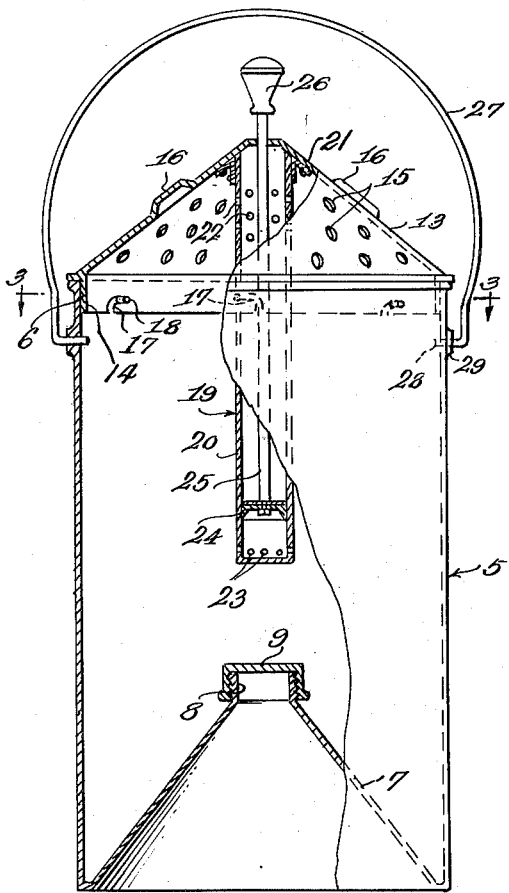
Figure 1 is a general side elevation of said embodiment, partly broken away to show internal construction.
Figure 2:
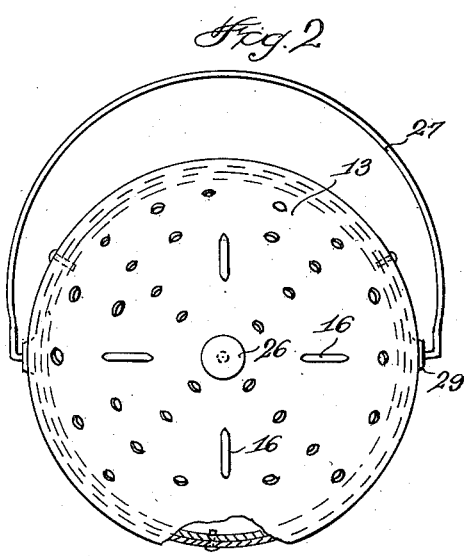
Figure 2 is a top plan view thereof, partly in section.
Figure 3:
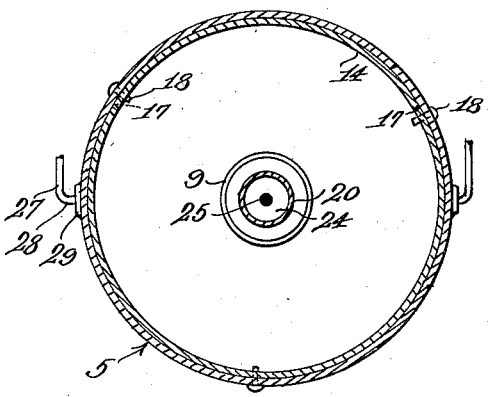
Figure 3 is a horizontal section taken on the line 3—3 of Figure 1.

Referring in detail to the drawing, the herein illustrated device comprises a cylindrical body 5 having an externally beaded open top 6, and an upset frusto-conical or funnel bottom 7, terminating in an externally threaded neck 8, for closing which there is provided a threaded cap 9. The entire body, including the bottom 7 and neck 8 are preferably formed integral of suitable transparent plastic material. The cap 9 is not used when the device is employed as a trap, with the device lying on its side and submerged on the bottom 10 of a stream 11, with the funnel bottom 7 facing downstream to receive the minnows 12 as they swim upstream.

However, when sufficient minnows have been trapped in the device, the cap 9 is threaded on the neck 8, thereby closing the bottom 7 and coverting the device into a minnow bucket.

The device is provided with a conical transparent plastic cover 13 having an inset depending annular flange 14 on its lower end arranged to telescope into the upper end 6 of the body 5, until said upper end is engaged by the overhang of the cover 13. The sides of the cover are provided with a multiplicity of relatively large holes 15, and at suitable intervals with integral external lugs 16 projecting therefrom to facilitate handling and rotating the cover, in order to engage and disengage bayonet slot 17 formed in the flange 14, with bayonet lugs 18 on the upper end of the cylinder 5, provided for holding the cover 13 in place.

An aerating pump 19 is built into the cover 13 and comprises a vertical pump cylinder 20 having its upper end secured by suitable means 21 to depend from the apex of the cover 13, with its lower end positioned about midway between the upper and lower ends of the cylinder 5. Intake airholes 22 are provided in the upper part of the pump cylinder 20 and air outlet holes 23 are provided in the lower part of the pump cylinder, which is fitted with a piston 24 of soft material such as leather on a piston rod 25 passing through the apex of the cover 13 and provided with a handle 26 on its upper end.

Figure 4:
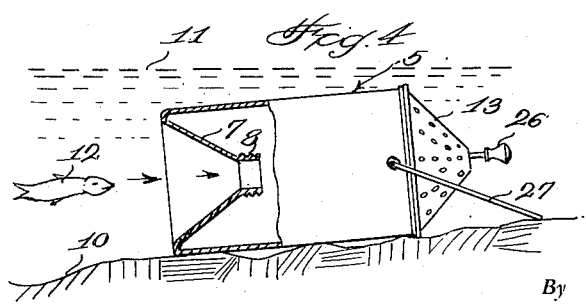
Figure 4 is a schematic view showing said embodiment, partly in side elevation and partly in section, and in use as a trap submerged in a stream.

As shown in Figure 4, where in use as a minnow trap the device is placed on the stream bottom 10 on its side, with the funnel bottom 7 facing downstream, the cap 9 having been removed to permit minnows to swim into the interior of the device, and with the cover 13 in place to trap the minnows within the device, while permitting the stream water to pass into the trap through the holes 15 and outwardly through the bottom opening 8. The device being transparent offers no apparent barrier to the entrance therein of the minnows and its transparency also enables the fisherman to see whether or not sufficient minnows have been trapped for his purpose, without withdrawing the trap from the stream.

While the device is in use as a minnow bucket, with the cap 9 in place on the neck 8 of the bottom 7, the water within the cylinder 5 may be occasionally aerated to supply the minnows therein with air whenever they show lack of sufficient air by coming to the surface, by reciprocating the pump handle 26.

A preferably metal bucket bail handle 27 having inturned terminals 28 arranged to enter holes formed in reinforcing bosses 29 provided on opposite sides of the upper end of the cylinder 5, is provided for conveying the device. It will be noted that the device when made from suitable transparent plastic material is substantially unbreakable, being resistant to all ordinary stresses and strains of service and being subject to be broken only by excessive crushing force exerted thereon.

I claim as my invention:

A combined minnow trap and bucket comprising a hollow cylindrical body having an open upper end, a perforated cover for closing said upper end formed with perforations to pass water and air but retain minnows, means for retaining said cover removably in place, said cylindrical body having a frusto-conical bottom terminating at its upper end in a reduced neck, and a removable closure for said neck, said frusto-conical bottom acting as a funnel for the entrance of swimming minnows into said body while said body is reclining on a stream bottom with said bottom facing downstream and said closure is removed from said neck, said frusto-conical bottom acting to retain water and minnows trapped in said body while said body is in an erect position and said closure is in place on said neck, and aerating means for aerating the water in said body to supply air for minnows therein while said body is in use as a minnow bucket, said aerating means comprising a pump comprising a pump cylinder depending from said top into the interior of said body to a point above said reduced neck of the bottom and provided with air intake holes at its upper end and air outlet holes at its lower end, and a piston working in said cylinder having a piston rod rising through said top and provided with a handle.

CARL R. BERGMAN.

REFERENCES CITED

The following references are of record in the file of this patent:

UNITED STATES PATENTS

| Number | Name | Date |
|---|---|---|
| De. 46,993 | Getz | Feb. 23, 1915 |
| 504,526 | Hemp | Sept. 5, 1893 |
| 647,257 | Gray | Apr. 10, 1900 |
| 1,976,134 | McPike | Oct. 9, 1934 |